(12) United States Patent
Niu et al.

(10) Patent No.: US 7,714,174 B2
(45) Date of Patent: May 11, 2010

(54) LOWER-COLOR POLYTRIMETHYLENE ETHER GLYCOL USING HYDRIDE COMPOUNDS

(75) Inventors: Yanhui Niu, Newark, DE (US); Zuohong Yin, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 640 days.

(21) Appl. No.: 11/728,630

(22) Filed: Mar. 27, 2007

(65) Prior Publication Data

US 2008/0242830 A1 Oct. 2, 2008

(51) Int. Cl.
*C07C 41/01* (2006.01)
*C08G 63/00* (2006.01)
(52) U.S. Cl. .................. 568/613; 568/619; 568/623; 568/679; 568/680; 528/425
(58) Field of Classification Search .................. None
See application file for complete search history.

(56) References Cited

U.S. PATENT DOCUMENTS

| | | | |
|---|---|---|---|
| 5,015,789 A | 5/1991 | Arntz et al. |
| 5,276,201 A | 1/1994 | Haas et al. |
| 5,284,979 A | 2/1994 | Haas et al. |
| 5,334,778 A | 8/1994 | Haas et al. |
| 5,364,984 A | 11/1994 | Arntz et al. |
| 5,364,987 A | 11/1994 | Haas et al. |
| 5,633,362 A | 5/1997 | Nagarajan et al. |
| 5,686,276 A | 11/1997 | Laffend et al. |
| 5,821,092 A | 10/1998 | Nagarajan et al. |
| 5,962,745 A | 10/1999 | Brossmer et al. |
| 6,140,543 A | 10/2000 | Brossmer et al. |
| 6,232,511 B1 | 5/2001 | Haas et al. |
| 6,235,948 B1 | 5/2001 | Sunkara et al. |
| 6,277,289 B1 | 8/2001 | Kurian et al. |
| 6,284,930 B1 | 9/2001 | Haas et al. |
| 6,297,408 B1 | 10/2001 | Haas et al. |
| 6,331,264 B1 | 12/2001 | Kurian et al. |
| 6,342,646 B1 | 1/2002 | Haas et al. |
| 6,608,168 B1 | 8/2003 | Ng |
| 6,720,459 B2 | 4/2004 | Sunkara et al. |
| 6,977,291 B2 | 12/2005 | Sunkara et al. |
| 7,157,607 B1 | 1/2007 | Sunkara et al. |
| 7,161,045 B1 | 1/2007 | Sunkara et al. |
| 7,164,046 B1 | 1/2007 | Sunkara et al. |
| 2002/0007043 A1 | 1/2002 | Sunkara et al. |
| 2004/0030095 A1 | 2/2004 | Sunkara et al. |
| 2004/0225161 A1 | 11/2004 | Sunkara et al. |
| 2004/0260125 A1 | 12/2004 | Seapan et al. |
| 2005/0020805 A1 | 1/2005 | Sunkara et al. |
| 2005/0028302 A1 | 2/2005 | Audousset et al. |
| 2005/0069997 A1 | 3/2005 | Adkesson et al. |
| 2005/0272911 A1 | 12/2005 | Okoshi et al. |
| 2007/0173669 A1 | 7/2007 | Sunkara et al. |
| 2007/0203371 A1 | 8/2007 | Sunkara et al. |

OTHER PUBLICATIONS

International Search Report dated Jul. 1, 2008 for International Application No. PCT/US2008/004084 (4 pages).
Currie, "Source Apportionment of Atmospheric Particles", Characterization of Environmental Particles, Buffle et al., Editors, 1 of vol. 1 of the IUPAC Environmental Analytical Chemistry Series (Lewis Publishers, Inc.) (1992), pp. 3-74.
Hoffmann et al., "Heat-Induced Aggregation of B-Lactoglobulin: Role of the Free Thiol Group and Disulfide Bonds", J. Agric. Food Chem., 45, (1997), pp. 2942-2948.
Hsieh, "Pool Size and Mean Age of Stable Soil Organic Carbon in Cropland", Soil. Sci. Soc. Am. J., vol. 56, Mar.-Apr. 1992, pp. 460-464.

*Primary Examiner*—Rosalynd Keys
(74) *Attorney, Agent, or Firm*—Gail D. Tanzer

(57) ABSTRACT

The present invention relates to a process for preparing lower-color polytrimethylene ether glycol, comprising contacting said polytrimethylene ether glycol, or its precursor reaction-mixture, with a hydride compound during at least one stage of the process of manufacture, or on the polytrimethylene ether glycol resulting form such process, such that the polytrimethylene ether glycol demonstrates a reduced color (as compared to using no hydride compound).

22 Claims, No Drawings

LOWER-COLOR POLYTRIMETHYLENE ETHER GLYCOL USING HYDRIDE COMPOUNDS

CROSS-REFERENCE TO RELATED APPLICATIONS

This application is related to commonly owned U.S. application Ser. No. 11/728,828 (filed concurrently herewith and entitled "LOWER-COLOR POLYTRIMETHYLENE ETHER GLYCOL USING ZERO-VALENT METALS"), the disclosure of which is incorporated by reference herein for all purposes as if fully set forth.

FIELD OF THE INVENTION

The present invention relates to a process for preparing lower-color polytrimethylene ether glycol polymer, comprising contacting said polytrimethylene ether glycol polymer, or its precursor reaction mixture, with a hydride compound, during at least one stage of the process of manufacture, or on the polytrimethylene glycol resulting from such process, such that the resulting polytrimethylene ether glycol demonstrates a reduced color (as compared to using no hydride compound).

BACKGROUND OF THE INVENTION

Polytrimethylene ether glycol (PO3G) and its uses have been described in the art. Preferred methods for preparation of a polytrimethylene ether glycol involve acid catalyzed polycondensation of 1,3-propanediol. For example, U.S. Pat. No. 6,720,459 and U.S. Pat. No. 6,977,291 disclose processes for preparation of a polytrimethylene ether glycol from 1,3-propanediol using a polycondensation catalyst, preferably an acid catalyst such as sulfuric acid.

Specifically, U.S. Pat. No. 6,977,291 describes a purification procedure for a crude polytrimethylene ether glycol obtained from an acid catalyzed polymerization process comprising: (1) a hydrolysis step to hydrolyze the acid esters formed during the acid catalyzed polymerization; (2) phase separation and water extraction steps to remove soluble acid catalyst, thereby generating an organic phase and a waste aqueous phase; (3) a base treatment of the organic phase to neutralize and precipitate the residual acid present; and (4) drying and filtration of the polymer to remove residual water and solids. It is clear from the disclosure that, when sulfuric acid is used as a catalyst to make polyether glycols from their corresponding diols, it is preferred to include a hydrolysis step because a substantial portion of the acid catalyst is converted to an ester (alkyl hydrogen sulfate).

U.S. 2005/0272911A1 and U.S. application Ser. No. 11/654,865 (filed Jan. 18, 2007) disclose polycondensation processes for preparing polyether polyols, including preparing polytrimethylene ether glycol from 1,3-propanediol, utilizing a polycondensation catalyst system that contains both an acid and a base. It is disclosed that the use of this catalyst system produces polyether polyol with a high degree of polymerization and low color under mild conditions. The purification processes utilize a hydrolysis step wherein water and organic solvent that has affinity for both water and the polyether polyol are used and subsequent separation into aqueous and organic phases. In one example of U.S. 2005/0227911A1, there is disclosed the use of calcium hydroxide to treat the organic phase after the phase separation.

U.S. Pat. No. 7,161,045 relates to a process of manufacture of polytrimethylene ether glycol comprising: (a) polycondensing reactant comprising a diol selected from the group consisting of 1,3-propanediol, 1,3-propanediol dimer and 1,3-propanediol trimer or mixtures thereof in the presence of an acid polycondensation catalyst to form polytrimethylene ether glycol; (b) adding water to the polytrimethylene ether glycol and hydrolyzing the acid esters formed during the polycondensation to form a hydrolyzed mixture containing the polytrimethylene ether glycol and the hydrolyzed acid esters; (c) adding an organic solvent that is immiscible with water to the hydrolyzed mixture to form an aqueous-organic mixture comprising (i) an organic phase containing polytrimethylene ether glycol and residual acid polycondensation catalyst from the polycondensing, and (ii) a water phase; (d) separating the water phase and the organic phase; (e) adding a base to the separated organic phase to neutralize the residual acid polycondensation catalyst by forming salts of the residual acid polycondensation catalyst; (f) separating the organic phase into (i) a liquid phase comprising the polytrimethylene ether glycol, the organic solvent and any residual water, and (ii) a solid phase comprising the salts of the residual acid polycondensation catalyst and the base which is unreacted; and (g) removing the organic solvent and the residual water from the organic phase to obtain polytrimethylene ether glycol. The organic solvent added in step (c) helps to promote phase formation and separation.

U.S. Pat. No. 7,157,607 discloses a process of manufacture of polytrimethylene ether glycol that is similar to that disclosed in previously incorporated U.S. Pat. No. 7,161,045, except that an organic solvent that is miscible with polytrimethylene ether is added to the hydrolyzed aqueous mixture.

U.S. Pat. No. 7,164,046 and U.S. application Ser. No. 11/599,861 (filed Nov. 15, 2006) disclose the addition of one or more water-soluble, inorganic compounds to the hydrolyzed mixture to promote phase formation and separation, wherein the water-soluble, inorganic compounds are selected from the group consisting of an inorganic salt and an inorganic base.

In the PO3G polymer manufacturing processes described above, it is commonly found that the polytrimethylene ether glycol polymers have residual color that results into a lower-quality polymer, not adequate for many of the polymer applications. The quality of 1,3-propanediol, the polymerization process conditions, and polymer degradation are most likely responsible for the polymer discoloration. In addition, the color of the final polymer can be affected by factors such as temperature of polymerization, oxidizing agents present in the reaction mixture, acidity, etc.

The presence of color is a major impediment to providing a high-quality polytrimethylene glycol polymer. Because a majority of the current PO3G processes involve high-temperature processing, discoloration could happen essentially at any step during the process, especially with a strong oxidizing agent (such as $H_2SO_4$) present in the mixture.

The present invention reduces color of the resulting polymeric PO3G, without substantially compromising polymer properties, preferably in a shorter cycle time and at a lower cost, by using a hydride compound at one or more stages of the PO3G.

SUMMARY OF THE INVENTION

In one aspect, the present invention is directed to a process for the manufacture of a polytrimethylene ether glycol, comprising the steps of:

(a) polycondensing reactant comprising a diol selected from the group consisting of 1,3-propanediol, 1,3-propanediol dimer, 1,3-propanediol trimer and mixtures thereof, in the presence of an acid polycondensation catalyst to form a polytrimethylene ether glycol and an acid ester of the acid polycondensation catalyst;

(b) adding water to the polytrimethylene ether glycol and hydrolyzing the acid ester formed during the polycondensation to form a hydrolyzed aqueous-organic mixture containing polytrimethylene ether glycol and residual acid polycondensation catalyst;

(c) forming an aqueous phase and an organic phase from the hydrolyzed aqueous-organic mixture, wherein the organic phase contains polytrimethylene ether glycol and residual acid polycondensation catalyst, (d) separating the aqueous phase and the organic phase;

(e) optionally adding base to the separated organic phase to neutralize residual acid polycondensation catalyst by forming salts of the residual acid polycondensation catalyst;

(f) removing residual water from the organic phase; and (g) in the event that a base is added in step (e), and optionally otherwise, separating the organic phase into (i) a liquid phase comprising polytrimethylene ether glycol, and (ii) a solid phase comprising the salts of the residual acid polycondensation catalyst and base which is unreacted, wherein a hydride compound (1) is added at least once during at least one of said steps (b), (c), (d), (e), (f) and (g), and/or (2) is contacted with polytrimethylene ether glycol from step (g).

Preferably, the forming of the aqueous and organic phases in step (c) (and thus the separation in step (d)) is enhanced by adding to the hydrolyzed aqueous-organic mixture:

(i) a water-soluble, inorganic compound selected from the group consisting of an inorganic salt and an inorganic base, and/or (ii)(1) a water-immiscible organic solvent that is miscible with polytrimethylene ether glycol, or (ii)(2) an organic solvent that is miscible with water and the polytrimethylene ether glycol.

DETAILED DESCRIPTION OF THE PREFERRED EMBODIMENTS

All publications, patent applications, patents and other references mentioned herein, if not otherwise indicated, are explicitly incorporated by reference herein for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of "a" or "an" are employed to describe elements and components of the invention. This is done merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting. Although methods and materials similar or equivalent to those described herein can be used in the practice or testing of the present invention, suitable methods and materials are described herein.

Starting Materials

The starting material for the process is reactant comprising at least one of 1,3-propanediol, 1,3-propanediol dimer and 1,3-propanediol trimer, or mixtures thereof.

The 1,3-propanediol reactant employed in the process of the present invention may be obtained by any of the various chemical routes or by biochemical transformation routes. Preferred routes are described in U.S. Pat. No. 5,015,789, U.S. Pat. No. 5,276,201, U.S. Pat. No. 5,284,979, U.S. Pat. No. 5,334,778, U.S. Pat. No. 5,364,984, U.S. Pat. No. 5,364,987, U.S. Pat. No. 5,633,362, U.S. Pat. No. 5,686,276, U.S. Pat. No. 5,821,092, U.S. Pat. No. 5,962,745, U.S. Pat. No. 6,140,543, U.S. Pat. No. 6,232,511, U.S. Pat. No. 6,235,948, U.S. Pat. No. 6,277,289, U.S. Pat. No. 6,284,930, U.S. Pat. No. 6,297,408, U.S. Pat. No. 6,331,264, U.S. Pat. No. 6,342,646, US2004/0225161A1, US2004/0260125A1, US2005/0069997A1 and U.S. application Ser. No. 11/599,861 (filed Nov. 15, 2006).

The preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species *Klebsiella, Citrobacter, Clostridium*, and *Lactobacillus*. The technique is disclosed in several patents, including U.S. Pat. No. 5,633,362, U.S. Pat. No. 5,686,276 and U.S. Pat. No. 5,821,092. For example, U.S. Pat. No. 5,821,092 discloses, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the processes disclosed in these publications provide a rapid, inexpensive and environmentally responsible source of 1,3-propanediol monomer.

The biologically-derived 1,3-propanediol, such as produced by the processes described and referenced above, contains carbon from the atmospheric carbon dioxide incorporated by plants, which compose the feedstock for the production of the 1,3-propanediol. In this way, the biologically-derived 1,3-propanediol preferred for use in the context of the present invention contains only renewable carbon, and not fossil fuel-based or petroleum-based carbon. The polytrimethylene ether glycol and personal care compositions of the present invention utilizing the biologically-derived 1,3-propanediol, therefore, have less impact on the environment as the 1,3-propanediol used in the compositions does not deplete diminishing fossil fuels and, upon degradation, releases carbon back to the atmosphere for use by plants once again. Thus, the compositions present invention can be characterized as more natural and having less environmental impact than similar compositions comprising petroleum based glycols.

The biologically-derived 1,3-propanediol, and polytrimethylene ether glycols, may be distinguished from similar compounds produced from a petrochemical source or from fossil fuel carbon by dual carbon-isotopic finger printing. This method usefully distinguishes chemically-identical materials, and apportions carbon in the copolymer by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," *Characterization of Environmental Particles*, J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship $$t=(-5730/0.693)\ln(A/A_0)$$

where t=age, 5730 years is the half-life of radiocarbon, and A and $A_0$ are the specific $^{14}C$ activity of the sample and of the modern standard, respectively (Hsieh, Y., *Soil Sci. Soc. Am J.*, 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2 \times 10^{-12}$, with an approximate relaxation "halflife" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-Industrial Revolution wood. For the current living biosphere (plant material), $f_M \approx 1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding $\delta^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects, the most significant of which for the instant invention is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphoenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. -10 to -14 per mil ($C_4$) and -21 to -26 per mil ($C_3$) (Weber et al., *J. Agric. Food Chem.*, 45, 2942 (1997)). Coal and petroleum fall generally in this latter range. The $^{13}C$ measurement scale was originally defined by a zero set by pee dee belemnite (PDB) limestone, where values are given in parts per thousand deviations from this material. The "$\delta^{13}C$" values are in parts per thousand (per mil), abbreviated ‰, and are calculated as follows:

$$\delta^{13}C \equiv \frac{(^{13}C/^{12}C)\text{sample} - (^{13}C/^{12}C)\text{standard}}{(^{13}C/^{12}C)\text{standard}} \times 1000‰$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Biologically-derived 1,3-propanediol, and compositions comprising biologically-derived 1,3-propanediol, therefore, may be completely distinguished from their petrochemical derived counterparts on the basis of $^{14}C$ ($f_M$) and dual carbon-isotopic fingerprinting, indicating new compositions of matter. The ability to distinguish these products is beneficial in tracking these materials in commerce. For example, products comprising both "new" and "old" carbon isotope profiles may be distinguished from products made only of "old" materials. Hence, the instant materials may be followed in commerce on the basis of their unique profile and for the purposes of defining competition, for determining shelf life, and especially for assessing environmental impact.

Preferably the 1,3-propanediol used as the reactant or as a component of the reactant will have a purity of greater than about 99%, and more preferably greater than about 99.9%, by weight as determined by gas chromatographic analysis. Particularly preferred are the purified 1,3-propanediols as disclosed in US20040260125A1, US20040225161A1 and US20050069997A1, and polytrimethylene ether glycol made therefrom as disclosed in US20050020805A1.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having L*a*b* "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

The starting material for making polytrimethylene ether glycol will depend on the desired polytrimethylene ether glycol, availability of starting materials, catalysts, equipment, etc., and comprises "1,3-propanediol reactant." By "1,3-propanediol reactant" is meant 1,3-propanediol, and oligomers and prepolymers of 1,3-propanediol preferably having a degree of polymerization of 2 to 9, and mixtures thereof. In some instances, it may be desirable to use up to 10% or more of low molecular weight oligomers where they are available. Thus, preferably the starting material comprises 1,3-propanediol and the dimer and trimer thereof. A particularly preferred starting material is comprised of about 90% by weight or more 1,3-propanediol, and more preferably 99% by weight or more 1,3-propanediol, based on the weight of the 1,3-propanediol reactant.

The starting material for the present invention may also contain small amounts, preferably no more than about 30%, and more preferably no more than about 10%, by weight, of the starting material, of comonomer diols in addition to the reactant 1,3-propanediol or its dimers and trimers without detracting from the efficacy of the process. Examples of preferred comonomer diols include ethylene glycol, 2-methyl-1,3-propanediol, 2,2-dimethyl-1,3 propanediol, and $C_6$-$C_{12}$ diols such as 2,2-diethyl-1,3-propanediol, 2-ethyl-2-hydroxymethyl-1,3-propanediol, 1,6-hexanediol, 1,8-octanediol, 1,10-decanediol, 1,12-dodecanediol, 1,4-cyclohexanediol and 1,4-cyclohexanedimethanol. A more preferred comonomer diol is ethylene glycol. Polytrimethylene ether glycols prepared from 1,3-propanediol and ethylene glycol are described in US2004/0030095A1.

The polytrimethylene ether glycols of this invention can also be prepared using from about 10 to about 0.1 mole percent of an aliphatic or aromatic diacid or diester, preferably terephthalic acid or dimethyl terephthalate, and most preferably terephthalic acid, as described in detail in U.S. Pat. No. 6,608,168.

Additives

Stabilizers (e.g., UV stabilizers, thermal stabilizers, antioxidants, corrosion inhibitors, etc.), viscosity boosters, antimicrobial additives and coloring materials (e.g., dyes, pigments, etc.) may be added to the polymerization mixture or final product if necessary.

Acid Catalysts

Any acid catalyst suitable for acid catalyzed polycondensation of 1,3-propanediol may be used in present process. Preferred acid polycondensation catalysts are described in previously incorporated U.S. Pat. No. 6,977,291 and U.S. Pat. No. 6,720,459. They are preferably selected from the group consisting of Lewis acids, Bronsted acids, super acids and mixtures thereof, and they include both homogeneous and heterogeneous catalysts. More preferably, the catalysts are selected from the group consisting of inorganic acids, organic sulfonic acids, heteropolyacids and metal salts. Still more preferably, the catalyst is a homogeneous catalyst, preferably selected from the group consisting of sulfuric acid, hydriodic acid, fluorosulfonic acid, phosphorous acid, p-toluenesulfonic acid, benzenesulfonic acid, methanesulfonic acid, phosphotungstic acid, trifluoromethanesulfonic acid, phosphomolybdic acid, 1,1,2,2-tetrafluoroethanesulfonic acid, 1,1,1,2,3,3-hexafluoropropanesulfonic acid, bismuth triflate, yttrium triflate, ytterbium triflate, neodymium triflate, lanthanum triflate, scandium triflate and zirconium triflate. The catalyst can also be a heterogeneous catalyst, preferably selected from the group consisting of zeolites, fluorinated alumina, acid-treated alumina, heteropolyacids and heteropolyacids supported on zirconia, titania alumina and/or silica. An especially preferred catalyst is sulfuric acid.

Preferably, the polycondensation catalyst is used in an amount of from about 0.1 wt % to about 3 wt %, more preferably from about 0.5 wt % to about 1.5 wt %, based on the weight of reactant.

The process of this invention may also be carried out using a base or a salt as a component of the catalyst system, such as the polycondensation catalyst that contains both an acid and a base described in previously incorporated US2005/0272911A1 and U.S. application Ser. No. 11/654,865 (filed Jan. 18, 2007). When base is used as a component of the polycondensation catalyst, the amount of base should be such that it insufficient to neutralize all of the acid present in the catalyst.

Optional additives may also be present during the polycondensation, for example, an inorganic compound such as an alkali metal carbonate, and an onium compound.

Preferred inorganic compounds are alkali metal carbonates, more preferably selected from potassium carbonate and/or sodium carbonate, and still more preferably sodium carbonate.

By onium compound is meant a salt which has onium ion as the counter cation. Generally, the onium salt has a cation (with its counterion) derived by addition of a hydron to a mononuclear parent hydride of the nitrogen, chalcogen and halogen family, e.g. $H_4N^+$ ammonium ion. It also includes $Cl_2F^+$ dichlorofluoronium, $(CH_3)_2S^+$ H dimethylsulfonium (a secondary sulfonium ion), $ClCH_3)_3P^+$ chlorotrimethylphosphonium, $(CH_3CH_2)_4N^+$ tetraethylammonium (a quaternary ammonium ion). Preferred are quaternary ammonium compounds, phosphonium compounds, arsonium compounds, stibonium compounds, oxonium ions, sulfonium compounds and halonium ions. Preferred compounds also include derivatives formed by substitution of the parent ions by univalent groups, e.g. $(CH_3)_2S^+$ H dimethylsulfonium, and $(CH_3CH_2)_4N^+$ tetraethylammonium. Onium compounds also include derivatives formed by substitution of the parent ions by groups having two or three free valencies on the same atom. Such derivatives are, whenever possible, designated by a specific class name, e.g. $RC\equiv O^+$ hydrocarbylidyne oxonium ions $R_2C=NH_2^+$ iminium ion, $RC=NH^+$ nitrilium ions. Other examples include carbenium ion and carbonium ion. Preferred onium compounds also include $Bu_4N^+HSO_4^-$, $(Me_4N)_2^+SO_4^{2-}$, $Py^+Cl^-$, $Py^+OH^-$, $Py^+(CH^2)^{15}CH^3Cl^-$, $Bu_4P^+Cl^-$ and $Ph_4^+PCl^-$.

Hydride Compounds

A hydride compound is added in at least one step during polymerization or preparation of the PO3G polymer to remove and/or reduce the color of the resulting pproduct.

Generally, a hydride is a compound of hydrogen with more electropositive elements. The term "hydride" is meant to include compounds involving hydrogen in direct bond with another element. Hydrides can be roughly classified into three main types by the nature of bonding and structure, (i) ionic hydrides, (ii) covalent hydrides, and (iii) interstitial hydrides of transitional metals. All three types are useful in the context of the present invention, with the covalent hydrides being preferred.

Preferred hydride compounds for the present invention are those comprising lithium, sodium, potassium, ammonium, aluminum, calcium and/or boron as the electropositive element. A preferred hydride compound is thus selected from a sodium-based hydride compound, a lithium-based hydride compound, a potassium-based hydride compound, an ammonium-based hydride compound, a calcium-based hydride compound, a boron-based hydride compound and an aluminum-based hydride compound, as well as mixtures thereof.

Lithium-based hydride compounds, by way of example, include lithium aluminum hydride, lithium mono ($C_{1-4}$ alkoxy) aluminum hydroxide, lithium di ($C_{1-4}$ alkoxy) aluminum hydride, lithium trialkoxy borohydride, lithium trimethoxy aluminum hydride, lithium aluminum trialkoxyhydride, and lithium aluminum hydride-aluminum chloride. A preferred lithium-based hydride compound is lithium aluminum hydride.

Sodium-based hydride compounds, by way of example, include sodium borohydride, sodium dihydro bis-(2-methoxy ethoxy) aluminate, sodium bis (2-methoxy ethoxy)aluminum hydride, sodium hydride, sodium aluminum hydride, sodium diethyl aluminum hydride, sodium trimethoxyborohydride, sodium triethoxyborohydride, sodium dimethoxyborohydride, sodium borohydride in lithium hydroxide solution, sodium borohydride-aluminum chloride, sodium borohydride-triethyloxonium fluoroborate, sodium acyl oxy borohydride, alkoxy-substituted sodium borohydride, and sodium diethyl aluminum borohydride. A preferred sodium-based hydride compound is sodium borohydride, sodium hydride, sodium borohydride-aluminum chloride, and alkoxy-substituted sodium borohydride.

Potassium-based hydride compounds include, by way of example, potassium borohydride, potassium trimethoxyborohydride, and potassium triethoxyborohydride.

Ammonium-based hydride compounds include, by way of example, ammonium borohydride, tetramethyl ammonium borohydride, and tetraorganoammonium borohydride. A preferred ammonium-based hydride compound is ammonium borohydride.

Aluminum-based hydride compounds include, by way of example, aluminum hydride, aluminum triisopropoxide/triisopropoxylaluminum, organoaluminum, hydrogenated organoaluminum, aluminum diisobutyl hydride, and aluminum hydride-aluminum chloride. A preferred aluminum-based hydride compound is aluminum hydride.

Boron-based hydride compounds include, by way of example, borane, boron hydride, alkoxy borane, alkyl borane, amine boranes, and diborane.

Other metal hydrides for use in the present invention include, for example, rubidium hydride, magnesium hydride, cesium hydride, calcium hydride, strontium hydride, barium hydride, organomagnesium, alkali metal hydride optionally substituted by 1-3 alkoxy groups, alkaline earth metal hydride, zinc borohydride, silicon hydride, tin hydride, Group IIIA hydride, organic phosphite, phosphine, phosphinate, alkoxy borohydride, stannous chloride, ruthenium trichloride, silane, diethylsilane, ammonium or hydrazinium salt of an inorganic acid anion selected from the class consisting of chloride, bromide, iodide, nitrate, phosphate, and perchlorate.

Preferably, the hydride compound is used in an amount in the range of from about 0.01 wt % to about 5 wt %, more preferably from about 0.03 wt % to about 2 wt %, based on the weight of reactant. The hydride compound can also be used in the amounts that are in increments of 0.01% between the range of 0.01 and 5%, for example, 0.01, 0.02, 0.03, ... so on, and so forth.

Step (a)—Polymerization Process

The polymerization process can be batch, semi-continuous, continuous, etc. A preferred batch process is described in previously incorporated US2002/0007043A1. In this embodiment, the polytrimethylene-ether glycol is prepared by a process comprising the steps of: (a) providing (1) reactant, and (2) acid polycondensation catalyst; and (b) polycondensing the reactants to form a polytrimethylene ether glycol. The reaction is conducted at an elevated temperature of at least about 150° C., more preferably at least about 160° C., up to about 210° C., more preferably about 200° C. The reaction is preferably conducted either at atmospheric pressure in the presence of inert gas or at reduced pressure (i.e., less than 760 mm Hg), preferably less than about 500 mm Hg in an inert atmosphere, and extremely low pressures can be used (e.g., as low as about 1 mm Hg or $133.3 \times 10^{-6}$ MPa).

A preferred continuous process for preparation of the polytrimethylene ether glycols of the present invention is described in previously incorporated U.S. Pat. No. 6,720,459. Thus, in this embodiment the polytrimethylene ether glycol is prepared by a continuous process comprising: (a) continuously providing (i) reactant, and (ii) polycondensation catalyst; and (b) continuously polycondensing the reactant to form polytrimethylene ether glycol.

Step (b)—Hydrolysis

Regardless of whether the process is a continuous or batch process, or otherwise, a substantial amount of acid ester is formed from reaction of the catalyst with the hydroxyl compounds, particularly when a homogeneous acid catalyst (and most particularly sulfuric acid) is used. In the case of sulfuric acid, a substantial portion of the acid is converted to the ester, alkyl hydrogen sulfate. It is important to remove these acid esters because, for example, they can act as emulsifying agents during the water washing used to remove catalyst and therefore cause the washing process to be difficult and time consuming. Moreover, the hydrolysis step is also important in order to obtain polymer with the high dihydroxy functionality required to use the polymer as a reactive intermediate. Furthermore, the hydrolysis step is also important in order to obtain polymer at conversion (yield).

Thus, the next step comprises hydrolyzing the acid esters formed during the polycondensing that are in the aqueous-organic mixture.

The hydrolysis step is preferably carried out by adding water to the polymer. The amount of water added can vary and is preferably from about 10 to about 200 wt %, more preferably from about 50 to about 100 wt %, based on the weight of the polytrimethylene ether glycol. Hydrolysis is preferably carried out by heating the aqueous-organic mixture to a temperature in the range from about 50 to about 110° C., preferably from about 90 to about 110° C. (and more preferably from about 90 to about 100° C. when carried out at atmospheric pressure), for a period of sufficient time to hydrolyze the acid esters. The hydrolysis step is preferably conducted at atmospheric or slightly above atmospheric pressure, preferably at about 700 mmHg to about 1600 mmHg. Higher pressures can be used, but are not preferred. The hydrolysis step is carried out preferably under inert gas atmosphere.

Steps (c) and (d)—Phase Formation/Separation

The next steps involve forming and separating the water phase and the organic phase.

Phase formation and separation is preferably promoted by either adding an inorganic compound such as a base and/or salt, or by adding an organic solvent to the reaction mixture, as disclosed in previously incorporated U.S. Pat. No. 7,157,607, U.S. Pat. No. 7,161,045, U.S. Pat. No. 7,164,046 and U.S. application Ser. No. 11/599,861 (filed Nov. 15, 2006).

Specifically, previously incorporated U.S. Pat. No. 7,157,607 and U.S. Pat. No. 7,161,045 disclose processes for preparing polytrimethylene ether glycol by acid polycondensation wherein the phase separation after hydrolysis is promoted by addition of organic solvent miscible with polytrimethylene ether glycol in the case of previously incorporated U.S. Pat. No. 7,157,607, and miscible with water in the case of previously incorporated U.S. Pat. No. 7,161,045. The solvents disclosed in these two publications also may be used conjunction with the water-soluble inorganic compounds disclosed in previously incorporated U.S. Pat. No. 7,164,046 and U.S. application Ser. No. 11/599,861 (filed Nov. 15, 2006) herein to promote phase separation.

Preferred is the use of the water-soluble inorganic compounds as disclosed in previously incorporated U.S. Pat. No. 7,164,046 and U.S. application Ser. No. 11/599,861 (filed Nov. 15, 2006), which are added to the aqueous polytrimethylene ether glycol mixture after hydrolysis.

Preferred water-soluble, inorganic compounds are inorganic salts and/or inorganic bases. Preferred salts are those comprising a cation selected from the group consisting of ammonium ion, Group IA metal cations, Group IIA metal cations and Group IIIA metal cations, and an anion selected from the group consisting of fluoride, chloride, bromide, iodide, carbonate, bicarbonate, sulfate, bisulfate, phosphate, hydrogen phosphate, and dihydrogen phosphate (preferably chloride, carbonate and bicarbonate). Group IA cations are lithium, sodium, potassium, rubidium, cesium and francium cations (preferably lithium, sodium and potassium); Group IIA cations are beryllium, magnesium, calcium, strontium, barium and radium (preferably magnesium and calcium); and Group IIIA cations are aluminum, gallium, indium and thallium cations. More preferred salts for the purposes of the invention are alkali metal, alkaline earth metal and ammonium chlorides such as ammonium chloride, lithium chloride, sodium chloride, potassium chloride, magnesium chloride, calcium chloride; and alkali metal and alkaline earth metal carbonates and bicarbonates such as sodium carbonate and sodium bicarbonate. The most preferred salt are sodium chloride; and alkali metal carbonates such as sodium and potassium carbonate, and particularly sodium carbonate.

Typical inorganic bases for use in the invention are ammonium hydroxide and water-soluble hydroxides derived from any of the above-mentioned Group IA, IIA and IIIA metal cations. The most preferred water-soluble inorganic bases are sodium hydroxide and potassium hydroxide.

The amount of water-soluble, inorganic compound used may vary, but is preferably the amount effective in promoting the rapid separation of the water and inorganic phases. The preferred amount for this purpose is from about 1 to about 20 wt %, more preferred amount from about 1 to about 10 wt %, and still more preferably from about 2 to about 8 wt %, based on the weight of the water added to the polytrimethylene ether glycol in the hydrolysis step.

Preferably the time required for phase separation is less than about one hour. More preferably this time period is from less than about 1 minute to about one hour, and most preferably about 30 minutes or less.

Separation is preferably carried out by allowing the water phase and the organic phase to separate and settle so that the water phase can be removed. The reaction mixture is allowed to stand, preferably without agitation until settling and phase separation has occurred.

Once phase separation has occurred, the water phase and the organic phase can be split, preferably by decantation or draining. It is advantageous to retain the organic phase in the reactor for subsequent processing. Consequently, when the organic phase is on bottom it is preferably to decant off the aqueous phase and when the organic phase is on top, it is preferred to drain off the aqueous phase.

A preferred phase separation method when high molecular weight polymer is obtained is gravity separation of the phases.

Step (e)—Neutralization

Following the hydrolysis and phase separation steps, a base, preferably a substantially water-insoluble base, may be added to neutralize any remaining acid. During this step residual acid polycondensation catalyst is converted into its corresponding salts. However, the neutralization step can be optional.

Preferably, the base is selected from the group consisting of alkaline earth metal hydroxides and alkaline earth metal oxides. More preferably, the base is selected from the group consisting of calcium hydroxide, calcium oxide, magnesium hydroxide, magnesium oxide, barium oxide and barium hydroxide. Mixtures may be used. A particularly preferred base is calcium hydroxide. The base may be added as a dry solid, or preferably as an aqueous slurry. The amount of insoluble base utilized in the neutralization step is preferably at least enough to neutralize all of the acid polycondensation catalyst. More preferably a stoichiometric excess of from about 0.1 wt % to about 10 wt % is utilized. The neutralization is preferably carried out at 50 to 90° C. for a period of from 0.1 to 3 hours under nitrogen atmosphere.

Step (f)—Water/Solvent Removal

Next, the organic solvent, if it was used in the process, and the residual water is preferably removed from the organic phase by vacuum stripping (e.g., distillation at low pressure), generally with heating, which will also remove organic solvent if present and, if desired, unreacted monomeric materials. Other techniques can be used, such as distillation at about atmospheric pressure.

Step (g)—Further Purification

When base is added in step (e) such that residual acid catalyst salts are formed, and optionally otherwise, the organic phase is separated into (i) a liquid phase comprising the polytrimethylene ether glycol, and (ii) a solid phase comprising the salts of the residual acid polycondensation catalyst and unreacted base. Typically, this α-curs by filtration (preferably with use of filter-aid material, for example as disclosed in US2005/028302A1, or centrifugation, to remove the base and the acid/base reaction products. Centrifugation and filtration methods are generally well known in the art. For example, filtration under the earth's gravity, centrifugal filtration, or pressure filtration can be used. Filter presses, candle filters, pressure leaf filters or conventional filter papers are also be used for the filtration, which can be carried out batch wise or continuously. Filtration in the presence of a filter-aid is preferred at a temperature range from 50 to 100° C. at a pressure range from 0.1 MPa to 0.5 MPa.

Even if base is not added in step (e), purification techniques like centrifugation and filtration may still be desirable for refining the final product.

Addition of Hydride Compound

As indicated previously, the hydride compound is added at least once during at least one of the steps (b), (c), (d), (e), (f) and (g), and/or is contacted with polytrimethylene ether glycol from step (g).

Preferably, the hydride compound is added at least once during at least one of the steps (d), (e), (f) and (g); more preferably during at least one of steps (d), (e) and (f); and still more preferably at least once during at least one of steps (d) and (e). Also preferred, either as the sole treating step in conjunction with any of the other steps, is when the hydride compound is contacted with polytrimethylene ether glycol from step (g).

In another preferred embodiment, the hydride compound is added more than once, preferably during neutralization (e), and/or during drying (f), and/or contacted with polytrimethylene ether glycol from step (g).

The hydride compound added at any time may be added as one single hydride compound or as a mixture of more than one hydride compound. Different hydride compounds may be added at different steps.

The hydride compound may be added all at one time in a single step, or it may be added in increments in a single step, or it may be added in increments over two or more steps. For example, if the amount of hydride compound metal to be added is X g, all of X g may be added in one step or, for example, X/Y g may be added over Y time intervals during one or more steps. The Y intervals need not be equal to each other in length of time.

The hydride compound can be added via any means known to a person of ordinary skill in the art, but is preferably added in its anhydrous form.

It has also been found that incorporation of hydride, particularly in anhydrous form, also effectively reduces residue amount of water in the step (f). This is advantageous to reduce the process cycle time.

The hydride compound can be of any size or shape such as powders, particles, nanopariticles, dust, foils and sticks, in nanometers to centimeters size. In principle, smaller size provides larger surface area and hence improved efficiency as known to a person of ordinary skill in the art; however it is also known to a person of ordinary skill of art that smaller size also results in difficulties in complete removal. The preferred range of sizes is from about 1 μm to about 5 mm.

Sufficient agitation is preferred during and after the addition of hydride compound. Preferably, the agitation is higher than about 25 rpm, and more preferably higher than about 100 rpm, for better dispersibility.

Other Purification Techniques

It should be noted that the present invention is not limited to using the addition of the hydride compound as the sole purification/color reduction technique, but can be combined with other well-known techniques as, for example, described in the previously incorporated publications, or with other techniques such as disclosed in commonly owned U.S. application Ser. No. 11/728,828 (filed concurrently herewith and entitled "LOWER-COLOR POLYTRIMETHYLENE ETHER GLYCOL USING ZERO-VALENT METALS").

Resulting PO3G

The polytrimethylene ether glycols preferred for use herein generally have a number average molecular weight from about 250 to about 7000, preferably from about 250 to about 5000. Mn of 500 to 5000 is preferred for many applications. Mn of 1000 to 3000 is further preferred.

The polytrimethylene ether glycols preferred for use herein are typically polydisperse polymers having a polydispersity of preferably from about 1.0 to about 2.2, more preferably from about 1.2 to about 2.0, and still more preferably from about 1.2 to about 1.8.

The polytrimethylene ether glycols made in accordance with the present invention preferably have a color reduction of great than about 10%, more preferably greater than about 30%, as compared with the process where a hydride compound is not used.

The polytrimethylene ether glycols for use in the present invention preferably have a color value of less than about 100 APHA, and more preferably less than about 40 APHA.

Polytrimethylene ether glycol as described above should in general have low acute oral toxicity, and not be a skin or eye irritant, or a skin sensitizer.

The invention is illustrated in the following examples. All parts, percentages, etc., referred to in the examples are by weight unless otherwise indicated.

EXAMPLES

The examples utilized a biologically-derived 1,3-propane diol ("bio-PDO"). The bio-PDO had a purity of higher than 99.99%.

I. Addition of $NaBH_4$ (Metal Hydride)

Example 1 (Comparative)

No Hydride Compound 1,3-propanediol (bio-PDO, 4000 g) and $Na_2CO_3$ (5.38 g) were charged into a 5 L glass flask and then heated to 170+/−1° C. under nitrogen with overhead stirring. Then 54.88 g of sulfuric acid was injected to the reaction flask and continue to heat at 170+/−1° C. for 10 hrs to produce polytrimethylene ether glycol. During the reaction, by-product water was removed with a condenser.

The resulting polymeric product was called the "Crude PO3G Product 1" for Examples 1-5.

Crude PO3G Product 1 (50 g) and an equal amount of deionized water (50 g) were charged into a 250 mL batch reactor and mixed by overhead stirring at 120 rpm under nitrogen blanketing. The polymer-water mixture was heated to 95° C. and held for 3 hrs. Subsequently, the mixture was cooled to 70° C. and the aqueous portion was removed.

The polymer-rich portion was hydrolyzed by addition of deionized water (50 g) under the same conditions for another one hour to complete the hydrolysis step. The aqueous phase was removed upon phase separation. The remainder PO3G-rich phase was neutralized with 0.25 g of $Ca(OH)_2$ (0.5%, wt/wt of crude polymer) at 70° C., for 2 hrs.

The mixture was subsequently dried at 85° C. under 3 torr pressure ($400 \times 10^{-6}$ MPa) for 3 hrs. The dried mixture was filtered with filter aid (Celpure® C 65, available from Advanced Minerals Corporation) at 80° C. (steam temperature). The color of the PO3G was measured with a UV-VIS spectrophotometer using the standard testing method according to ASTM D 5386-93b.

The APHA (American Public Health Association) number was calculated from absorbance data collected every 5 nm from 780 nm to 380 nm. Absorbance data were converted to transmittance. A calibration of APHA vs. Yellowness index was performed using PtCo standards ranging from APHA 15 to 500 according to the ASTM standard D 5386-93b. The APHA color number was 122.2.

Example 2

0.02% Sodium Borohydride After Neutralization

Example 1 was repeated except that $NaBH_4$ (0.02% wt/wt, equivalent to 0.010 g, based on Crude PO3G Product 1 amount) was added to the mixture after the neutralization step, and the resulting mixture was heated at 80° C. for another 10 min while stirring at 120 rpm. The mixture was then dried and filtered. The APHA color number was 68.2.

Example 3

0.05% Sodium Borohydride After Neutralization

Example 2 was repeated, except that 0.05% wt/wt (equivalent to 0.025 g, based on Crude PO3G Product 1 amount) $NaBH_4$ was used. The APHA color number was 53.5.

Example 4

0.1% Sodium Borohydride After Neutralization

Example 2 was repeated, except that 0.1% wt/wt (equivalent to 0.05 g, based on Crude PO3G Product 1 amount) $NaBH_4$ was used. The APHA color number was 57.0.

Example 5

0.5% Sodium Borohydride After Neutralization

Example 2 was repeated, except that 0.5% wt/wt (equivalent to 0.25 g, based on Crude PO3G Product 1 amount) $NaBH_4$ was used. The APHA color number was 38.0.

TABLE 1

| EX | Concentration of NaBH4-Added After Neutralization, % | Color Number (APHA) |
|---|---|---|
| 1 (COMP) | 0 | 122.2 |
| 2 | 0.02 | 68.2 |
| 3 | 0.05 | 53.5 |
| 4 | 0.1 | 57.0 |
| 5 | 0.5 | 38.0 |

II. NaBH4 Added to Polymer with Heating

Example 6 (Comparative)

No Hydride Compound 1,3-propanediol (bio-PDO, 11892 g) and sulfuric acid (108 g) were charged into a 20 L reactor and then heated to 166+/−1° C. under nitrogen with overhead stirring for 26 hrs to produce polytrimethylene ether glycol. During the reaction, by-product water was removed with a condenser.

The resulting polymeric product was called the "Crude PO3G Product 2" for Examples 6-11.

Crude PO3G Product 2 (50 g), 0.5 g Zn dust and an equal amount of deionized water (50 g) were charged into a 250 mL batch reactor and mixed by overhead stirring at 120 rpm under nitrogen blanketing. The polymer-water mixture was heated to 95° C. and held for 3 hrs. Subsequently, the mixture was cooled to 70° C. and the aqueous portion was removed.

The polymer-rich portion was hydrolyzed by addition of deionized water (50 g) under the same conditions for another one hour to complete the hydrolysis step. The aqueous phase was removed upon phase separation. The remainder PO3G-rich phase was neutralized with 0.25 g of $Ca(OH)_2$ (0.5%, wt/wt of crude polymer) at 70° C., for 2 hrs.

The mixture was subsequently dried at 85° C. under 3 torr pressure ($400 \times 10^{-6}$ MPa) for 3 hrs. The dried mixture was filtered with filter aid (Celpure® C 65, available from Advanced Minerals Corporation) at 80° C. (steam temperature). This "Purified PO3G Product 1" was used for Examples 6-11.

Purified PO3G Product 1 (10 g) was heated to 95° C. for 3 hrs again while stirring with magnetic stirring bar. It was then filtered with a syringe frit (0.2 μm). After syringe filtration, the color of the PO3G was measured with a UV-VIS spectrophotometer. The APHA color number was 188.2.

Example 7

1.0% $NaBH_4$ $NaBH_4$ (1% wt/wt) was added to 10 g of Purified PO3G Product 1. The mixture was subsequently heated to 95° C. for 3 hrs while stirring with magnetic stirring bar. It was then filtered with a syringe frit (0.2 μm). After syringe filtration, the color of the PO3G was measured with a UV-VIS spectrophotometer. The APHA color number was 129.3.

Example 8

1.0% $NaBH_4$ and 2 g DI Water Added $NaBH_4$ (1% wt/wt) and 2 g of DI $H_2O$ were added to 10 g of Purified PO3G Product 1. The mixture was subsequently heated to 95° C. for 3 hrs while stirring with magnetic stirring bar. The mixture was subsequently dried at 85° C. under 3 torr pressure ($400 \times 10^{-6}$ MPa) for 1 hr. It was then filtered with a syringe frit (0.2 μm). After syringe filtration, the color of the PO3G was measured with a UV-VIS spectrophotometer. The APHA color number was 105.8.

TABLE 2

| EX | Additive | Concentration % and (g) | Color Number APHA |
|---|---|---|---|
| 6 (COMP) | No additive | 0 | 188.2 |
| 7 | NaBH4 | 1% | 129.3 |
| 8 | NaBH$_4$ and H$_2$O | 1% and 2 (g) | 105.8 |

III. NaBH$_4$ or H$_2$O Added under Room Temperature Conditions

Example 9 (Comparative)

No NaBH$_4$ or H$_2$O Added

Purified PO3G Product 1 (10 g) was stirred for 3 hrs at room temperature. It was pump-dried and filtered with a syringe frit (0.2 μm). After syringe filtration, the color of the PO3G was measured with a UV-VIS spectrophotometer. The APHA color number was 181.9.

Example 10

1.0% NaBH$_4$ Added

NaBH$_4$ (1% wt/wt) was added to 10 g of Purified PO3G Product 1. The mixture was stirred for 3 hrs at room temperature. It was pump-dried and then filtered with a syringe frit (0.2 μm). After syringe filtration, the color of the PO3G was measured with a UV-VIS spectrophotometer. The APHA color number was 150.7.

Example 11

1.0% NaBH$_4$ and 2 g DI Water Added

NaBH$_4$ (1% wt/wt) and 2 g of DI H$_2$O were added to 10 g of Purified PO3G Product 1. The mixture was stirred for 3 hrs at room temperature. It was pump-dried at 85° C. under 3 torr pressure (400×10$^{-6}$ MPa) for 1 hr, and then filtered with a syringe frit (0.2 μm). After syringe filtration, the color of the PO3G was measured with a UV-VIS spectrophotometer. The APHA color number was 101.7.

TABLE 3

| EX | Additive | Concentration % and (g) | Color Number APHA |
|---|---|---|---|
| 9 (COMP) | No additive | 0 | 181.9 |
| 10 | NaBH4 | 1% | 150.7 |
| 11 | NaBH$_4$ and H$_2$O | 1% and 2 (g) | 101.7 |

IV. Other Hydride Compounds

Example 12

0.1% LiAlH$_4$ 1,3-propanediol (bio-PDO, 3000 g) and Na$_2$CO$_3$ (1.99 g) were charged into a 5 L glass flask and then heated to 170+/−1° C. under nitrogen with overhead stirring. Then 28.42 g of sulfuric acid was injected to the reaction flask and continue to heat at 170+/−1° C. for 24 hrs to produce polytrimethylene ether glycol. During the reaction, by-product water was removed with a condenser.

The resulting polymeric product was called the "Crude PO3G Product 3" for examples 12-24.

Crude PO3G Product 3 (50 g) and an equal amount of deionized water (50 g) were charged into a 250 mL batch reactor and mixed by overhead stirring at 120 rpm under nitrogen blanketing. The polymer-water mixture was heated to 95° C. and held for 3 hrs. Subsequently, the mixture was cooled to 70° C. and the aqueous portion was removed.

The polymer-rich portion was hydrolyzed by addition of deionized water (50 g) under the same conditions for another one hour to complete the hydrolysis step. The aqueous phase was removed upon phase separation. The remainder PO3G-rich phase was neutralized with 0.25 g of Ca(OH)$_2$ (0.5%, wt/wt of crude polymer) at 70° C., for 2 hrs.

The mixture was subsequently dried at 85° C. under 3 torr pressure (400×10$^4$ MPa) for 3 hrs. The dried mixture was filtered with filter aid (Celpure® C 65, available from Advanced Minerals Corporation) at 80° C. (steam temperature) to produce purified PO3G. The resulting polymeric product was called the "Purified PO3G Product 2" for Examples 12 and 18-19.

LiAlH$_4$ powder (0.05 g, 0.1% wt/wt) was added to Purified PO3G Product 2 (50 g) and was stirred at 70° C. for 15 min. Subsequently, 2 g DI water was added to the mixture and stirred for 5 min. The mixture was then pumped dry at 86° C. for 2 hrs with the pressure of 3 Torr (400×10$^{-6}$ MPa). The dried mixture was filtered with a filtration aid (Celpure® C65) at 80° C.

The APHA number, as measured with a UV-VIS spectrophotometer, was 76.7. In contrast, the color of the sample where LiAlH$_4$ was not employed during neutralization was 92.0.

V. NaBH$_4$ Added During Drying

Example 13 (Comparative)

1.5 Hours of Drying and No Hydride Compound

Crude PO3G Product 3 (50 g) was subjected to hydrolysis, phase separation and neutralization as described in Example 1. Subsequently, the polymer was pumped dry for 1.5 h at 105° C. under a vacuum of 3 torr (400×10$^{-6}$ MPa). The polymer was then filtered with a syringe frit (0.2 μm). The color of the PO3G was measured with a UV-VIS spectrophotometer. The APHA color number was 37.7.

Example 14

1.5 Hours of Drying and 0.1% NaBH$_4$

Crude PO3G Product 3 (50 g) was subjected to hydrolysis, phase separation and neutralization as described in Example 1. Subsequently, 0.1% wt of NaBH$_4$ was added to the polymer and the mixture was stirred for 15 min. at 70° C. The polymer was pumped dry for 1.5 h at 105° C. under a vacuum of 3 torr (400×10$^{-6}$ MPa) and filtered with a syringe frit (0.2 μm). The color of the PO3G was measured with a UV-VIS spectrophotometer. The APHA color number was 28.6.

Example 15

2.5 Hours of Drying and 0.1% NaBH$_4$

Crude PO3G Product 3 (50 g) was subjected to hydrolysis, phase separation and neutralization as described in Example 1. Subsequently, 0.1% wt. of NaBH$_4$ was added to the polymer and the mixture was stirred for 15 min. at 70° C. The polymer was pumped dry for 2.5 h at 105° C. under a vacuum of 3 torr (400×10$^{-6}$ MPa) and filtered with a syringe frit (0.2 μm). The color of the PO3G was measured with a UV-VIS spectrophotometer. The APHA color number was 20.6.

Example 16

Two Drying Steps and 0.1% NaBH$_4$

Crude PO3G Product 3 (50 g) was subjected to hydrolysis, phase separation and neutralization as described in Example 1, and was pumped dry for 2.5 h at 105° C. under a vacuum of 3 torr (400×10$^{-6}$ MPa). Subsequently, 0.1% wt of NaBH$_4$ was added to the polymer and the mixture was stirred for 15 min. at 70° C. The polymer was again pumped dry for 3.5 h at 105° C. under a vacuum of 3 torr (400×10$^{-6}$ MPa) and filtered with a syringe frit (0.2 μm). The color of the PO3G was measured with a UV-VIS spectrophotometer. The APHA color number was 16.2.

Example 17

Two Drying Steps and Two Step Addition of 0.1% NaBH$_4$

Crude PO3G Product 3 (50 g) was subjected to hydrolysis, phase separation and neutralization as described in Example 1, and was pumped dry for 2.5 h at 105° C. under a vacuum of 3 torr (400×10$^{-6}$ MPa). Subsequently, 0.1% wt of NaBH$_4$ was added to the polymer and the mixture was stirred for 15 min. at 70° C. The polymer was again pumped dry for 3.5 h at 105° C. under a vacuum of 3 torr (400×10$^{-6}$ MPa), and again 0.1% wt of NaBH$_4$ was added to the polymer and the mixture was stirred for 15 min. at 70° C. It was then filtered with a syringe frit (0.2 μm). The color of the PO3G was measured with a UV-VIS spectrophotometer. The APHA color number was 14.5.

TABLE 4

| EX | Drying Conditions | NaBH$_4$ Additive Addition % | Color Number APHA |
|---|---|---|---|
| 13 (COMP) | 1.5 hrs One step | No additive | 37.7 |
| 14 | 1.5 hrs One step | 0.1 | 28.6 |
| 15 | 2.5 hrs One step | 0.1 | 20.6 |
| 16 | 2.5 hrs and 3.5 hrs, in Two steps | 0.1 in between two drying steps | 16.2 |
| 17 | 2.5 hrs and 3.5 hrs, in Two steps | 0.1 and 0.1 in between two drying steps and after second drying step | 14.5 |

VI. Improved Efficiency of Water Removal from Polymer

Example 18

With and Without NaBH$_4$ Addition

Two samples of Purified PO3G Product 2 (100 g each) were pumped dry for 2 hrs and 6 hrs, respectively, at 10 torr (1333×10$^{-6}$ MPa). Each sample was then divided into two portions. The first portion was stirred for 15 min and filtered with a syringe frit (0.2 μm) in the dry box. To the second portion of both samples was added 0.1% wt of NaBH$_4$ and the polymer samples were stirred for 15 min and filtered with a syringe frit (0.2 μm). The water amount in the samples was detected with water analyzer.

TABLE 5

| Drying Time | Water Concentration- No added NaBH$_4$ | Water Concentration- With added NaBH$_4$ |
|---|---|---|
| 2 hrs | 0.1522% | 0.1138% |
| 6 hrs | 0.0552% | 0.0442% |

Example 19

With and Without NaBH$_4$ Addition

Three samples of Purified PO3G Product 2 (100 (g) each) were pumped dry for 45 min, 1.5 hr and 2.5 hrs, respectively, at 10 torr (1333×10$^{-6}$ MPa). Each sample was then divided into two portions. The first portion was stirred for 15 min and filtered with a syringe frit (0.2 μm) in the dry box. To the second portion of the three samples was added 0.1% wt of NaBH$_4$ (0.1 g) and the polymer samples were stirred for 15 min and filtered with a syringe frit (0.2 μm). The water amount in the samples was detected with water analyzer.

TABLE 6

| Drying Time | Water Concentration- No added NaBH$_4$ | Water Concentration- With added NaBH$_4$ |
|---|---|---|
| 0.75 hr | 0.179% | 0.104% |
| 1.5 hr | 0.187% | 0.134% |
| 2.5 hrs | 0.160% | 0.102% |

VII. Improved Efficiency of Water Removal from Crude Polymer

Example 20 (Comparative)

1.5 Hours of Drying and Without NaBH$_4$ Addition

Crude PO3G Product 3 (50 g) was subjected to hydrolysis, phase separation and neutralization as described in Example 1. After neutralization, the sample was pumped dry for 1.5 hr at 105° C. under 3 torr (400×10$^{-6}$ MPa). The sample was filtered with a syringe frit (0.2 μm) in the dry box. The water amount in the samples was detected with water analyzer at 1013 ppm.

Example 21

1.5 Hours of Drying and 0.1% NaBH$_4$

Crude PO3G Product 3 (50 g) was subjected to hydrolysis, phase separation and neutralization as described in Example 1. To the sample was added 0.1 wt % of NaBH$_4$ and the sample was stirred for 15 min at 70° C. Subsequently, the sample was pumped dry for 1.5 hr at 105° C. under 3 torr (400×10$^{-6}$ MPa). The sample was filtered with a syringe frit (0.2 μm) in the dry box. The water amount in the samples was detected with water analyzer at 520.9 ppm.

Example 22 (Comparative)

2.5 Hours of Drying and Without NaBH$_4$ Addition

Crude PO3G Product 3 (50 g) was subjected to hydrolysis, phase separation and neutralization as described in Example 1. After neutralization, the sample was pumped dry for 2.5 hr at 105° C. under 3 torr (400×10⁻⁶ MPa). The sample was filtered with a syringe frit (0.2 μm) in the dry box. The water amount in the samples was detected with water analyzer at 405.7 ppm.

Example 23

1.5 Hours of Drying and 0.1% NaBH$_4$

Crude PO3G Product 3 (50 g) was subjected to hydrolysis, phase separation and neutralization as described in Example 1. To the sample was added 0.1 wt % of NaBH$_4$ and the sample was stirred for 15 min at 70° C. Subsequently, the sample was pumped dry for 2.5 hr at 105° C. under 3 torr (400×10⁻⁶ MPa). The sample was filtered with a syringe frit (0.2 μm) in the dry box. The water amount in the samples was detected with water analyzer at 446.5 ppm.

Example 24

With Two NaBH$_4$ Additions

Crude PO3G Product 3 (50 g) was subjected to hydrolysis, phase separation and neutralization as described in Example 1. To the sample was added 0.1 wt % of NaBH$_4$ and the sample was stirred for 15 min at 70° C. Subsequently, the sample was pumped dry for 2.5 hr at 105° C. under 3 torr (400×10⁻⁶ MPa). A second portion of 0.1 wt % of NaBH$_4$ was added to the PO3G sample and it was stirred for 15 min at 70° C. It was filtered with a syringe frit (0.2 μm). The water amount in the samples was detected with water analyzer at 289.3 ppm.

TABLE 7

| Drying Time | Water Concentration- No added NaBH$_4$, PPM | Water Conc. %-With 0.1% added NaBH$_4$, PPM | Water Conc. %-With NaBH$_4$ added Twice (0.1% × 2), PPM |
| --- | --- | --- | --- |
| 1.5 hr | 1013 | 521 | — |
| 2.5 hrs | 406 | 446 | 289 |

What is claimed is:

1. A process for the manufacture of a polytrimethylene ether glycol, comprising the steps of:
    (a) polycondensing reactant comprising a diol selected from the group consisting of 1,3-propanediol, 1,3-propanediol dimer, 1,3-propanediol trimer and mixtures thereof, in the presence of an acid polycondensation catalyst to form a polytrimethylene ether glycol and an acid ester of the acid polycondensation catalyst;
    (b) adding water to the polytrimethylene ether glycol and hydrolyzing the acid ester formed during the polycondensation to form a hydrolyzed aqueous-organic mixture containing polytrimethylene ether glycol and residual acid polycondensation catalyst;
    (c) forming an aqueous phase and an organic phase from the hydrolyzed aqueous-organic mixture, wherein the organic phase contains polytrimethylene ether glycol and residual acid polycondensation catalyst,
    (d) separating the aqueous phase and the organic phase;
    (e) optionally adding base to the separated organic phase to neutralize residual acid polycondensation catalyst by forming salts of the residual acid polycondensation catalyst;
    (f) removing residual water from the organic phase; and
    (g) in the event that a base is added in step (e), and optionally otherwise, separating the organic phase into (i) a liquid phase comprising polytrimethylene ether glycol, and (ii) a solid phase comprising the salts of the residual acid polycondensation catalyst and base which is unreacted,
wherein a hydride compound (1) is added at least once during at least one of said steps (b), (c), (d), (e), (f) and (g), and/or (2) is contacted with polytrimethylene ether glycol from step (g).

2. The process of claim 1, wherein the hydride compound is (1) added at least once during at least one of said steps (d), (e), (f) and (g), and/or (2) is contacted with polytrimethylene ether glycol from step (g).

3. The process of claim 1, wherein the hydride compound is added at least once during at least one of said steps (d) and (e).

4. The process of claim 1, wherein hydride compound is contacted with polytrimethylene ether glycol from step (g).

5. The process of claim 1, wherein the hydride compound is added under agitation.

6. The process of claim 1, wherein the hydride compound is added in an amount so as to achieve a color reduction in the polytrimethylene ether glycol of greater than about 10%, as compared with the process where a hydride compound is not used.

7. The process of claim 1, wherein the hydride compound is added in an amount so as to achieve a color reduction in the polytrimethylene ether glycol of greater than about 30%, as compared with the process where a hydride compound is not used.

8. The process of claim 1, wherein the hydride compound is used in an amount in the range of from about 0.01 wt % to about 5 wt % based on the weight of reactant.

9. The process of claim 1, wherein the hydride compound is used in an amount in the range of from about 0.03 wt % to about 2 wt % based on the weight of reactant.

10. The process of claim 1, wherein the hydride compound is a covalent hydride.

11. The process of claim 1, wherein the hydride compound comprises comprising lithium, sodium, potassium, ammonium, aluminum, calcium and/or boron as an electropositive element.

12. The process of claim 1, wherein the hydride compound comprises a sodium-based hydride compound.

13. The process of claim 1, wherein the hydride compound comprises a sodium-based hydride compound selected from the group consisting of sodium borohydride, sodium hydride, sodium borohydride-aluminum chloride, and alkoxy-substituted sodium borohydride.

14. The process of claim 1, wherein the hydride compound is added in increments in a single step.

15. The process of claim 1, wherein the hydride compound is added in increments over two or more steps.

16. The process of claim 1, wherein the following is added to the hydrolyzed aqueous-organic mixture:
    (i) a water-soluble, inorganic compound selected from the group consisting of an inorganic salt and an inorganic base, and/or
    (ii)(1) a water-immiscible organic solvent that is miscible with polytrimethylene ether glycol, or
    (ii)(2) an organic solvent that is miscible with water and the polytrimethylene ether glycol.

17. The process of claim 1, wherein the 1,3-propane diol is biologically-derived.

18. The process of claim 1, wherein the 1,3-propane diol has the following characteristics:
   (1) an ultraviolet absorption at 220 nm of less than about 0.200, and at 250 nm of less than about 0.075, and at 275 nm of less than about 0.075; and/or
   (2) a composition having L*a*b* "b*" color value of less than about 0.15 (ASTM D6290), and an absorbance at 270 nm of less than about 0.075; and/or
   (3) a peroxide composition of less than about 10 ppm; and/or
   (4) a concentration of total organic impurities (organic compounds other than 1,3-propanediol) of less than about 400 ppm, as measured by gas chromatography.

19. The process of claim 1, wherein the 1,3-propane diol has the following characteristics:
   (1) an ultraviolet absorption at 220 nm of less than about 0.200, and at 250 nm of less than about 0.075, and at 275 nm of less than about 0.075; and
   (2) a composition having L*a*b* "b*" color value of less than about 0.15 (ASTM D6290), and an absorbance at 270 nm of less than about 0.075; and
   (3) a peroxide composition of less than about 10 ppm; and
   (4) a concentration of total organic impurities (organic compounds other than 1,3-propanediol) of less than about 400 ppm, as measured by gas chromatography.

20. The process of claim 1, wherein the acid polycondensation catalyst comprises a base in an amount less than that required to neutralize the acid.

21. The process of claim 15, wherein a water-soluble inorganic compound selected form the group consisting of sodium carbonate and potassium carbonate is added to the hydrolyzed aqueous-organic mixture.

22. The process of claim 1, wherein the hydride compound is added at least once during at least one of said steps (d) and (e) and/or is contacted with polytrimethylene ether glycol from step (g); the hydride compound is added under agitation; the hydride compound is a covalent hydride; and the hydride compound is used in an amount in the range of from about 0.01 wt % to about 5 wt % based on the weight of reactant, and is added in an amount so as to achieve a color reduction in the polytrimethylene ether glycol of greater than about 10%, as compared with the process where a hydride compound is not used.

* * * * *

UNITED STATES PATENT AND TRADEMARK OFFICE
CERTIFICATE OF CORRECTION

PATENT NO.        : 7,714,174 B2                                        Page 1 of 1
APPLICATION NO. : 11/728630
DATED             : May 11, 2010
INVENTOR(S)       : Niu Yanhui and Yin Zuohong It is certified that error appears in the above-identified patent and that said Letters Patent is hereby corrected as shown below:

On the Title page, Item (57) Abstract, line 6 incorrectly reads:
"...glycol resulting form such process, such that the polytrimeth-..."

On the Title page, Item (57) Abstract, line 6 should read:
-- ...glycol resulting from such process, such that the polytrimeth-...--

Signed and Sealed this

Fifth Day of October, 2010

David J. Kappos
*Director of the United States Patent and Trademark Office*